United States Patent
Kumazawa

(10) Patent No.: US 9,729,867 B2
(45) Date of Patent: Aug. 8, 2017

(54) WIRELESS COMMUNICATION TERMINAL AND COMMUNICATION CONTROL METHOD

(75) Inventor: Masayuki Kumazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 14/232,028

(22) PCT Filed: Jul. 26, 2012

(86) PCT No.: PCT/JP2012/004781
§ 371 (c)(1),
(2), (4) Date: Jan. 10, 2014

(87) PCT Pub. No.: WO2013/018332
PCT Pub. Date: Feb. 7, 2013

(65) Prior Publication Data
US 2014/0146123 A1    May 29, 2014

(30) Foreign Application Priority Data
Jul. 29, 2011   (JP) ................................ 2011-167285

(51) Int. Cl.
*H04N 17/00* (2006.01)
*H04N 7/15* (2006.01)
(Continued)

(52) U.S. Cl.
CPC ............ *H04N 17/00* (2013.01); *H04N 7/148* (2013.01); *H04N 7/15* (2013.01);
(Continued)

(58) Field of Classification Search
CPC ........ H04N 7/173; H04N 5/225; H04N 7/148; H04N 7/00; H04N 7/15; H04W 72/0406;
(Continued)

(56) References Cited

U.S. PATENT DOCUMENTS 6,937,594 B2 *   8/2005   Smith ................. H04L 12/2697
                                                       370/241.1
2007/0025237 A1   2/2007   Goto
(Continued)

FOREIGN PATENT DOCUMENTS

JP     2004-208098 A     7/2004
JP     2007-150916 A     6/2007
(Continued)

OTHER PUBLICATIONS

Hoshino et al, JP2010-011287 (machine translated).*
(Continued)

*Primary Examiner* — Ping Hsieh
*Assistant Examiner* — James Yang
(74) *Attorney, Agent, or Firm* — Pearne & Gordon LLP

(57) ABSTRACT

A wireless communication terminal includes an encoder, configured to encode content data; a destination setting section, configured to set a network address on feedback data for the wireless communication terminal, the network address being set on the wireless communication terminal; a transmitter, configured to transmit the feedback data; a receiver, configured to receive the feedback data transmitted form the transmitter and transferred by way of the wireless communication network; and a reproduction processor, configured to perform reproduction processing on the content data in accordance with the received feedback data.

21 Claims, 17 Drawing Sheets

(51) Int. Cl.
*H04W 72/04* (2009.01)
*H04N 21/4223* (2011.01)
*H04N 21/432* (2011.01)
*H04N 7/14* (2006.01)
*H04W 88/02* (2009.01)

(52) U.S. Cl.
CPC ..... *H04N 21/4223* (2013.01); *H04N 21/4325* (2013.01); *H04W 72/0406* (2013.01); *H04W 88/02* (2013.01)

(58) Field of Classification Search
CPC ..... H04W 12/06; H04W 52/24; H04W 48/18; H04M 1/2535; H04L 12/2697
See application file for complete search history.

(56) References Cited

U.S. PATENT DOCUMENTS

| | | | | |
|---|---|---|---|---|
| 2007/0081477 | A1* | 4/2007 | Jakkahalli | H04L 12/4645 370/310 |
| 2007/0120958 | A1* | 5/2007 | Sunahara | H04N 7/148 348/14.01 |
| 2008/0137577 | A1* | 6/2008 | Habetha | H04W 28/22 370/311 |
| 2008/0304420 | A1* | 12/2008 | Deragon | H04L 1/243 370/249 |
| 2009/0258672 | A1* | 10/2009 | Camp, Jr. | H04W 48/18 455/553.1 |

FOREIGN PATENT DOCUMENTS

| | | |
|---|---|---|
| JP | 2010-011287 A | 1/2010 |
| JP | 2010-074360 A | 4/2010 |
| JP | 2011-147082 A | 7/2011 |
| WO | 2005/020450 A1 | 3/2005 |

OTHER PUBLICATIONS

Vocal Tech, 80211awhitepaper, 2002 http://www.vocal.com/wp-content/uploads/2012/05/80211a_wp1pdf.pdf.*
International Search Report for PCT/JP2012/004781 dated Aug. 21, 2012.

* cited by examiner

FIG.11

| SEQUENCE NUMBER | RECEPTION TIME |
|---|---|
| 1 | sec: 20F1A531, usec: 00000000 |
| 2 | sec: 20F1A531, usec: 000003E8 |
| 3 | sec: 20F1A531, usec: 000007D0 |
| 5 | sec: 20F1A531, usec: 00000FA0 |
| 6 | sec: 20F1A531, usec: 00001388 |
| 9 | sec: 20F1A531, usec: 00001B58 |

(a)

| SEQUENCE NUMBER | TRANSMISSION TIME | RECEPTION TIME |
|---|---|---|
| 101 | sec: 20F1A531 usec: 00000000 | sec: 20F1A531 usec: 000493E0 |
| 102 | sec: 20F1A531 usec: 000003E8 | sec: 20F1A531 usec: 000497C8 |
| 103 | sec: 20F1A531 usec: 000007D0 | sec: 20F1A531 usec: 00049BB0 |
| 105 | sec: 20F1A531 usec: 00000FA0 | sec: 20F1A531 usec: 0004A38A |

(b)

WIRELESS COMMUNICATION TERMINAL AND COMMUNICATION CONTROL METHOD

TECHNICAL FIELD

The present invention relates to a wireless communication terminal that performs a communication by use of a wireless communication technique and a communication control method under which the wireless communication terminal acquires information about communication quality of a wireless communication network.

BACKGROUND ART

A PDC or a GSM (registered trademark), both of which are related-art public wireless communication networks, uses low frequency bands, and hence text-based communications such as emails or small-size web pages, have been mainstream of communications of mobile terminals. The 3G standard, the HSPA (High Speed Packet Access) standard, the LTE (Long Term Evolution) standard, the WiMAX standard, or the like, has recently been put into practice, and the band of the public wireless communication network has become wider accordingly. For these reasons, in addition to being able to browse a web page, the volume of which is equivalent to a web page which is browsed by use of a personal computer connected to the Internet by means of a cable, the mobile terminal can carry out communication of a large volume of data such as images and sounds. In particular, in relation to an HSUPA (High Speed Uplink Packet Access), the LTE, or the WiMAX standard, a so-called uplink communication frequency band from a mobile terminal toward a base station is also broadened. Therefore, data such as images and sounds can be uploaded by means of real-time streaming in addition to downloading by means of real-time streaming. Consequently, application of the wireless communication to a TV phone or a TV conference using mobile terminals, a live broadcast from the spot by way of a public wireless communication network, and the like, has been conceived.

In the meantime, although the maximum uplink frequency band of the public wireless communication network can be set to 1 Mbps to about 37 Mbps that are equal to the maximum frequency bands of a wired communication network, the wireless communication, contrary to the wired communication network, is susceptible to variations in radio environment according to various conditions. For this reason, a communication is not always practicable at the maximum frequency band in the public wireless communication network all the time. In short, the communication standards, except the 3G standard, adopt a so-called best effort communication that distributes a fixed frequency band to users around a base station. For this reason, the larger the number of users located around a base station, the smaller the frequency band allocated to each user. In addition, communication quality such as a frequency band, a packet loss rate and a delay, varies under various conditions, such as influence of handover stemming from traveling of the user and influence of fading caused by surrounding buildings.

Consequently, if the frequency band drops to 1 Mbps for reasons of fluctuations in radio environment, or the like, when the mobile terminal is in the course of transmitting image data in real time at; for instance, 5.7 Mbps that is the maximum frequency band of the HSUPA, images will be interrupted on a receiver side. The mobile terminal must take measures, such as transmitting the image data at a higher compression rate; for instance, 1 Mbps, and the like. In addition, when communication quality is poor, a user of the mobile terminal must attempt to improve the radio environment by changing his/her location, in addition to the data compression rate being changed by the mobile terminal.

In order to take measures conforming to the radio environment, such as those mentioned above, it is necessary for the mobile terminal on the transmission side to grasp communication quality of the public communication network. Therefore, when the mobile terminal transmits data, such as images and sounds, by means of real-time streaming, it is very critical for the communication terminal to acquire communication quality reflecting the radio environment.

Patent Literature 1 describes a technique for presenting a receiving state of a communication party on the other end to the user of the communication terminal. FIG. 17 is a diagram showing an example internal configuration of a network terminal described in Patent Literature 1. In a terminal 103, data encoded by an encoder 201 are transmitted to a terminal 105 by way of a transmission buffer 203, and simultaneously accumulated in a local buffer 205. Subsequently, a reproduction image quality determination section 221 in the terminal 105 determines quality of a reproduced image during reproduction of received data. On occasion of determination of quality of a reproduced image, the image quality of a reproduced image may differ from image quality achieved at transmission, under influence of a packet loss during transmission/reception of data. Reproduction image quality information including the influence is fed back from the terminal 105 to the terminal 103. The terminal 103 decodes and reproduces the data accumulated in the local buffer 205 in accordance with the reproduction image quality information. The image can thereby be reproduced on the terminal 103 at the same quality as that of an image actually reproduced by the terminal 105. The user of the terminal 103 can attempt to optimize image quality by changing control of parameters and a location of the terminal 103 (i.e., the location of the terminal 103) in accordance with the image quality.

CITATION LIST

Patent Literature

Patent Literature 1: JP-A-2007-150916
Patent Literature 2: JP-A-2010-11287
Patent Literature 3: WO 2005/020450 A1

SUMMARY OF INVENTION

Technical Problem

Under the aforementioned technique described in connection with Patent Literature 1, the terminal 103 on the transmission side cannot recognize the image quality achieved on the terminal 105 without a feedback of the reproduction image quality information from the terminal 105 on the receiving side. However, the feedback of reproduction image quality information involves steps of: transmitting data from the terminal 103; receiving the data at the terminal 105; determining reproduction image quality during reproduction of reproduced data; and notifying the terminal 103 of a determination result. For this reason, depending on throughput of a communication network lying between the terminals 103 and 105, consumption of commensurate time is required before the terminal 103 acquires the reproduction image quality information.

An object of the present invention is to provide a wireless communication terminal and a communication control method that enable quick acquisition of information about reproduction image quality of transmitted content data on a receiving device.

Solution to Problem

The present invention provides a wireless communication terminal for transmitting data to a predetermined destination by way of a wireless communication network, the wireless communication terminal including: an encoder, configured to encode content data; a destination setting section, configured to set a network address on feedback data for the wireless communication terminal, wherein the network address is set on the wireless communication terminal; a transmitter, configured to transmit the feedback data to the wireless communication network; a receiver, configured to receive the feedback data transmitted from the transmitter and transferred by way of the wireless communication network; and a reproduction processor, configured to perform reproduction processing on the content data in accordance with the feedback data received by the receiver.

The present invention provides a communication control method to be performed by a wireless communication terminal for transmitting data to a predetermined destination by way of a wireless communication network, the communication control method including: encoding content data; setting a network address on feedback data for the wireless communication terminal, wherein the network address is set on the wireless communication terminal; transmitting the feedback data to the wireless communication network; receiving the feedback data that is transmitted from the wireless communication terminal and transferred by way of the wireless communication network; and reproducing the content data in accordance with the received feedback data.

Advantageous Effects of Invention

A wireless communication terminal and a communication control method according to the present invention enable shortening of a time which will be consumed to acquire information about quality of an image which will be reproduced from transmitted content data by a receiving device.

BRIEF DESCRIPTION OF DRAWINGS

In FIG. 11, (a) and (b) are tables showing examples feedback data received by a reception IF.

MODES FOR CARRYING OUT INVENTION

Embodiments of the present invention will be hereunder described by reference to the drawings.

First Embodiment

Figure 1:
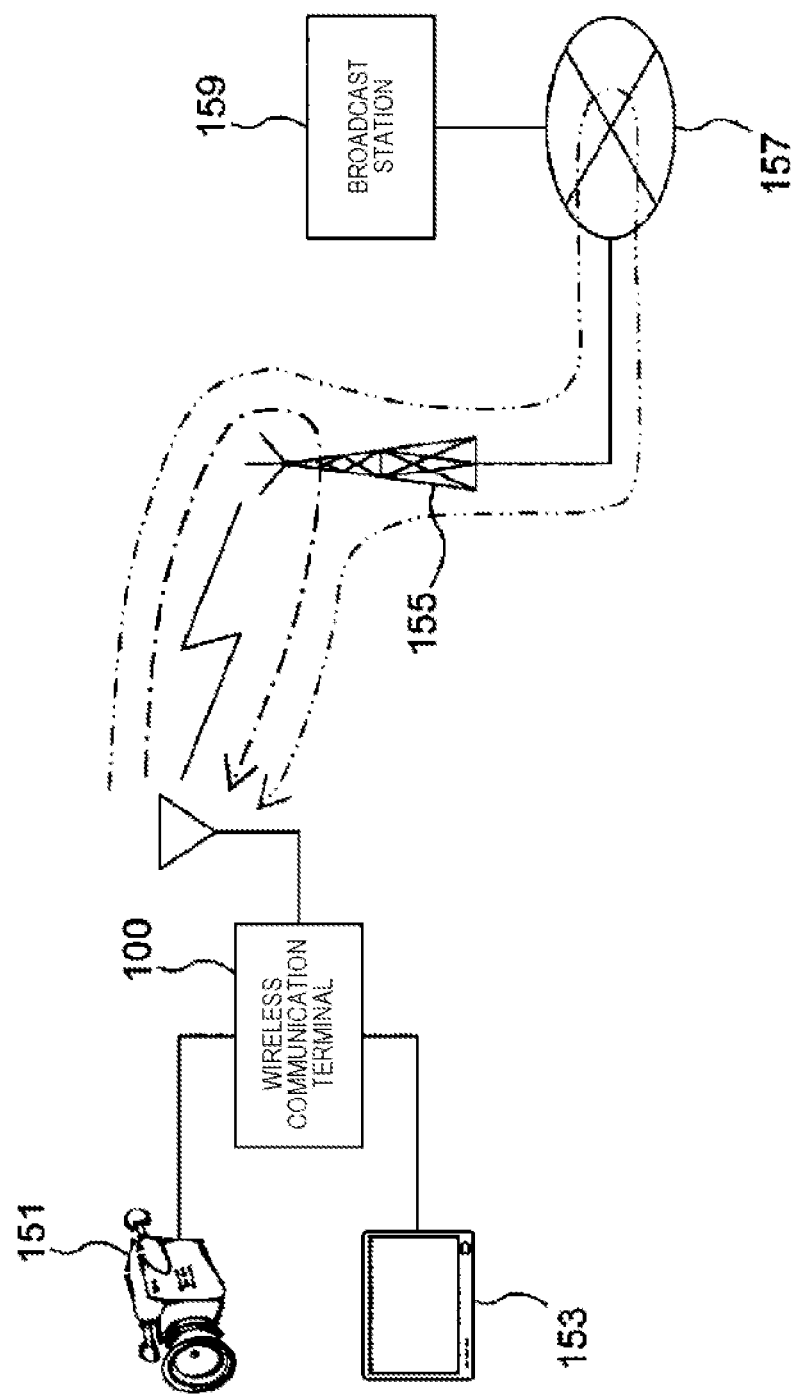
FIG. 1 is a diagram showing an example communication network system including a wireless communication terminal according to a first embodiment.

FIG. 1 is a diagram showing an example communication network system including a wireless communication terminal according to a first embodiment. As shown in FIG. 1, a wireless communication terminal 100 is connected to a video camera 151 and a display 153. The wireless communication terminal 100 can transmit data (hereinafter called "content data") such as images and sounds captured by a video camera 151, to a broadcast station 159 by way of a public wireless communication network, a base station 155, and a wired network 157. Moreover, simultaneously with or before transmission of the content data to the broadcast station 159, the wireless communication terminal 100 transmits data, whose destination is set on itself, which are to be returned from the base station 155 or the wired network 157 (hereinafter called "feedback data").

As shown in FIG. 1, the feedback data are returned by a device with a layer-3 (network-layer) routing function disposed in the base station 155 or the wired network 157 and thereafter received by the wireless communication terminal 100. Consequently, the feedback data, which the wireless communication terminal 100 transmits, go back and forth over the public wireless communication network until the wireless communication terminal 100 receives the feedback data. Incidentally, when a private line is used for the wired network 157, a delay in feedback data that passes through the wired network 157 is very small, and a loss factor is also negligible. For these reasons, influence which the feedback data will undergo can be deemed to be only influence that will affect the data in the course of propagating through the public wireless communication network.

Figure 2:
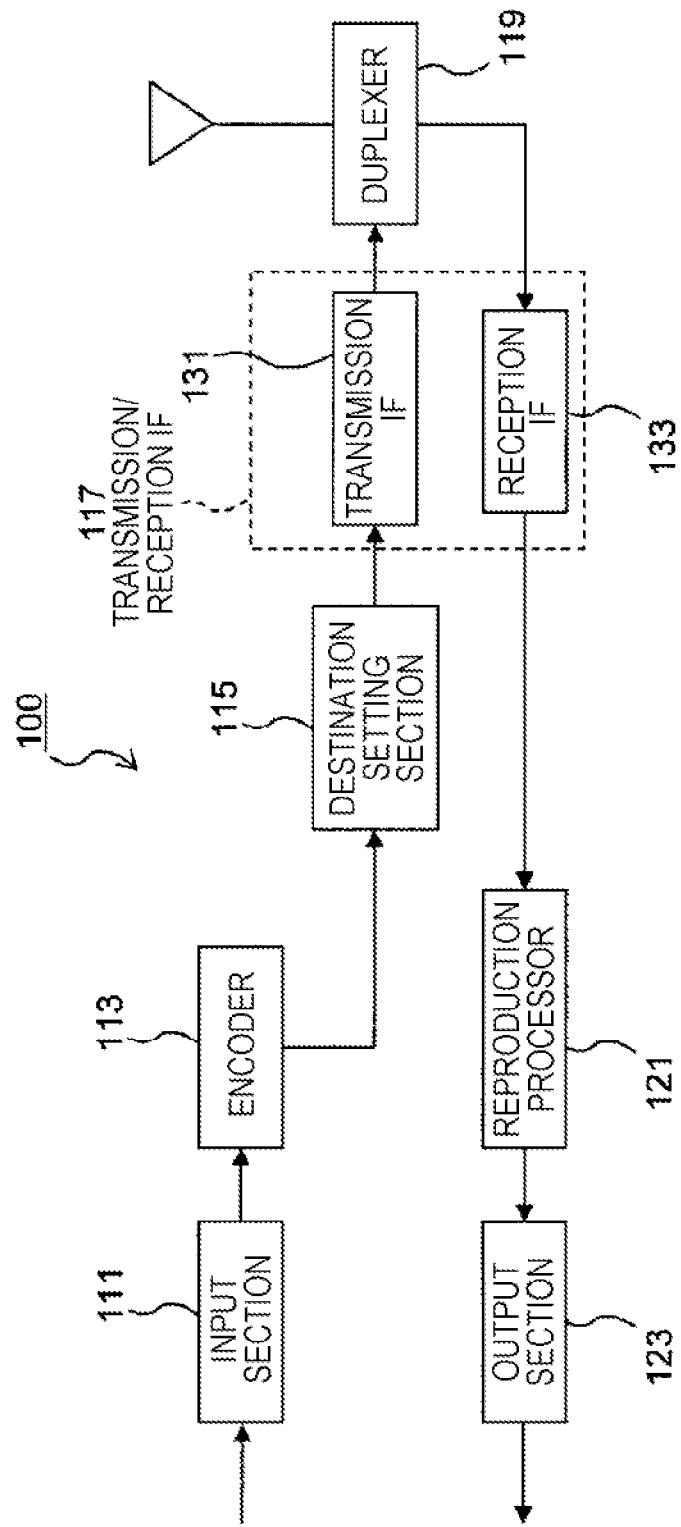
FIG. 2 is a block diagram showing an internal configuration of the wireless communication terminal according to the first embodiment.

FIG. 2 is a block diagram showing an internal configuration of the wireless communication terminal according to the first embodiment. As shown in FIG. 2, the wireless communication terminal 100 according to the first embodiment is provided with an input section 111, an encoder 113, a destination setting section 115, a transmission/reception interface (transmission/reception IF) 117, a duplexer 119, a reproduction processor 121, and an output section 123.

The input section 111 is an input interface for content data captured by the video camera 151 such as images and sounds. The encoder 113 encodes the content data input to the input section 111. The destination setting section 115 sets a destination to be employed at the time of transmission of encoded content data. Incidentally, the "destination" is a network address (also called a "layer-3 address") that enables network equipment such as a router, to return the feedback data to the wireless communication terminal 100 and are typically represented by an IP address (hereinbelow referred to simply as an "address"). Content data whose destination is set on the wireless communication terminal 100 by the destination setting section 115 correspond to the aforementioned "feedback data." In the embodiment, the content data whose destination is set on the broadcast station 159 are handled as content data without modification, whilst content data whose destination is set on the own terminal are handled as feedback data.

The transmission/reception IF 117 includes a transmission interface (a transmission IF) 131 and a reception interface (a reception interface IF) 133. The transmission IF 131 and the reception IF 133 are interfaces for transmission and reception that may be physically equal to but logically different from the transmission/reception IF 117. Specifically, one address is set on the transmission IF 131, and another address is set on the reception IF 133. The transmission IF 131 transmits encoded content data or feedback data in the form of a packet to the public wireless communication network. The reception IF 133 receives feedback data whose destination is set on the wireless communication terminal 100; namely, feedback data that are set on the address of the reception IF 133 and transmitted from the transmission IF 131. As mentioned above, the feedback data received by the reception IF 133 are round-trip data that have propagated through the public wireless communication network.

The duplexer 119 divides a frequency signal that carries data to be transmitted from the transmission IF 131 and a frequency signal that carries data to be received by the reception IF 133. The reproduction processor 121 decodes the feedback data received by the reception IF 133, reproducing content data. The output section 123 is an interface that outputs data to the display 153 connected to the wireless communication terminal 100 such that the decoded data are reproduced. Depending on the radio environment of the public wireless communication network for the wireless communication terminal 100, the feedback data received by the reception IF 133 include a packet loss, and the like. Consequently, images and sounds to be displayed on the display 153 are reproduced under influence of the packet loss, and the like.

Figure 3:
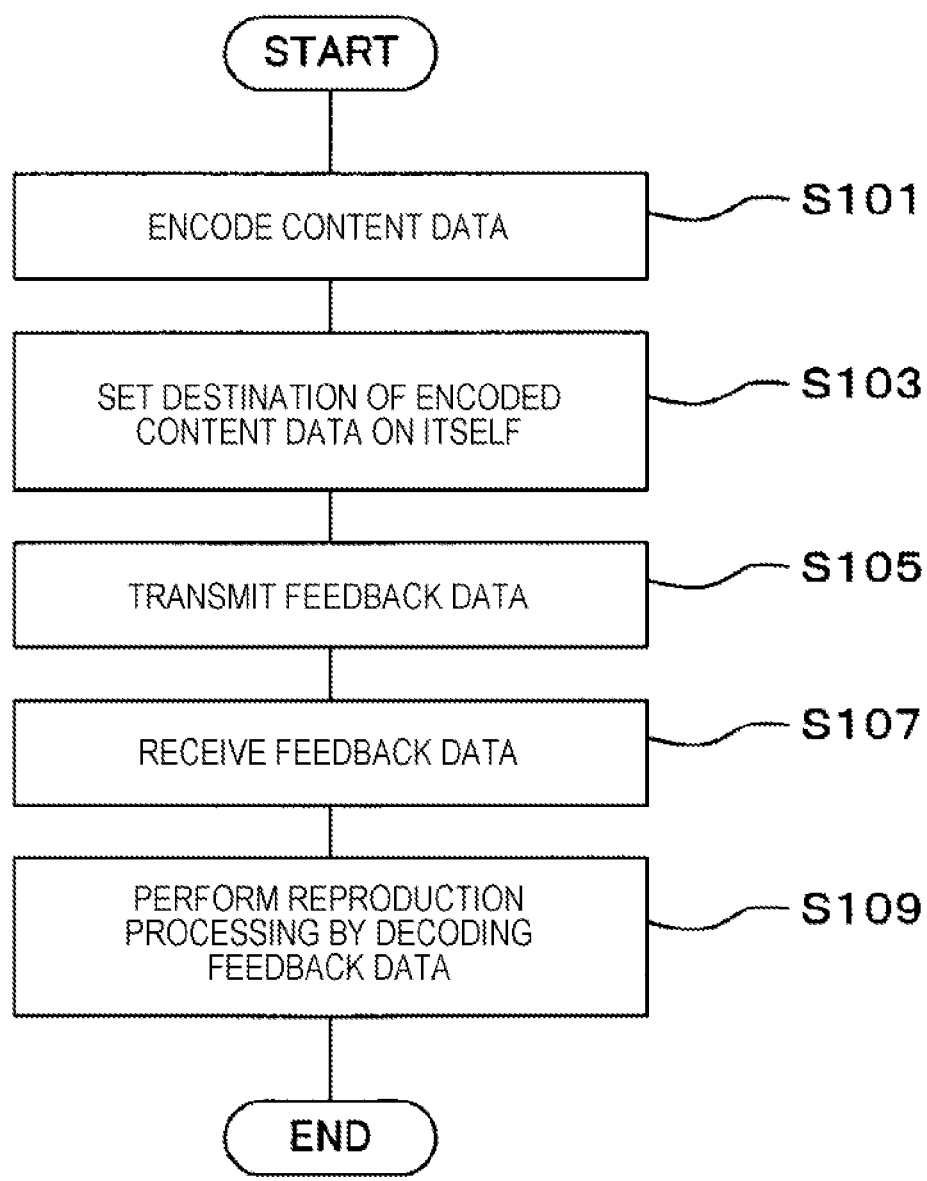
FIG. 3 is a flowchart showing example operation of the wireless communication terminal according to the first embodiment.

FIG. 3 is a flowchart showing example operation of the wireless communication terminal according to the first embodiment. In the example shown in FIG. 3, before the wireless communication terminal 100 transmits content data to the broadcast station 159, transmission and reception of feedback data are performed in order to previously ascertain a state of images and sounds which will be reproduced by the broadcast station 159.

As shown in FIG. 3, the encoder 113 encodes the content data input to the input section 111 (step S101). Next, the destination setting section 115 sets a destination of the encoded content data on the own terminal (step S103). Subsequently, the content data are handled as feedback data. The transmission IF 131 then transmits feedback data (step S105).

Next, the reception IF 133 receives the feedback data that are transmitted from the wireless communication terminal 100 and transferred by way of the public wireless communication network and the base station 155 (step S107). The reproduction processor 121 then performs reproduction processing by decoding the feedback data received by the reception IF 133 (step S109). As mentioned previously, the content data decoded by the reproduction processor 121 are reproduced on the display 153, so that the user of the wireless communication terminal 100 ascertains a state of reproduction of the content data (image quality, skipping of sound, and the like).

As above, in the embodiment, the user of the wireless communication terminal 100 can ascertain in advance a state in which the content data propagated through the public wireless communication network are reproduced by the broadcast station 159 (i.e., image quality, skipping of sound, and the like) from the feedback data that are transmitted from the wireless communication terminal 100 and received by way of the public wireless communication network. Therefore, the embodiment is useful in a scene in which the user desires to ascertain a data transmission status by means of only the own terminal with a view toward searching for a location in a superior radio environment before transmission of data to the broadcast station 159.

In addition, the feedback data are returned, without passing by the broadcast station 159, by way of the public wireless communication network where the data are most susceptible to influence in view of communication quality. Consequently, the wireless communication terminal 100 can quickly receive feedback data which have undergone the same degree of influence as that the content data undergo in the course of propagating to the broadcast station 159.

Second Embodiment

Figure 4:
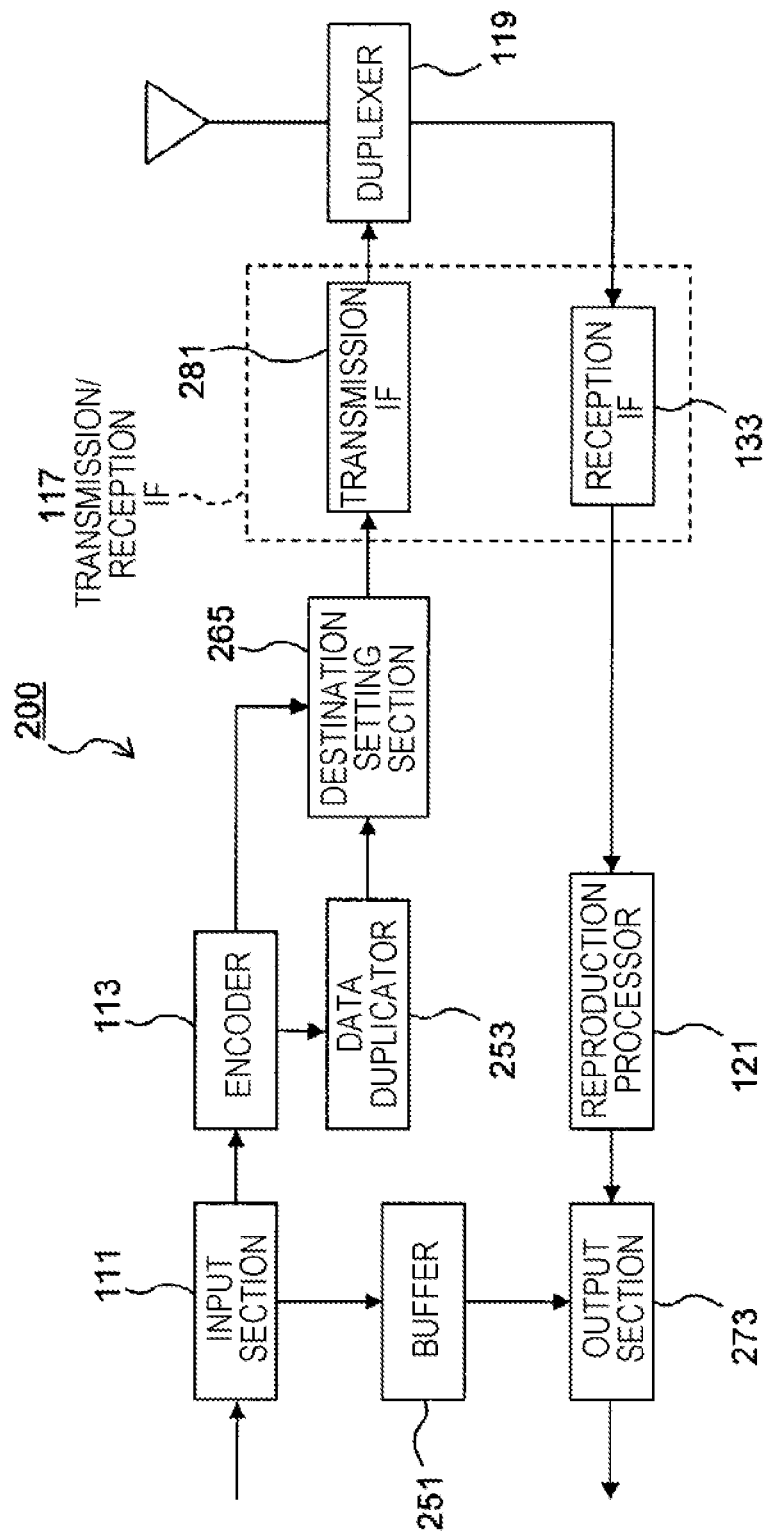
FIG. 4 is a block diagram showing an internal configuration of a wireless communication terminal according to a second embodiment.

A communication network system in which a wireless communication terminal 200 according to a second embodiment is provided is analogous to the example shown in FIG. 1. FIG. 4 is a block diagram showing an internal configuration of the wireless communication terminal according to the second embodiment. As shown in FIG. 4, the wireless communication terminal 200 according to the second embodiment differs from the wireless communication terminal 100 according to the first embodiment in that the wireless communication terminal 200 additionally has a buffer 251 and a data duplicator 253 and in that a destination setting section 265, a transmission IF 281, and an output section 273 operate differently when compared with the destination setting section 115, the transmission IF 131, and the output section 123 described in connection with the first embodiment. The second embodiment is analogous to the first embodiment except for the above, and constituents that are common between FIG. 4 and FIG. 1 are assigned the same reference numerals.

The buffer 251 temporarily stores the content data input to the input section 111 and outputs the thus-stored content data to the output section 273. The data duplicator 253 duplicates the content data encoded by the encoder 113. The thus-duplicated content data are sent to the destination setting section 265.

The destination setting section 265 sets a destination of the content data encoded by the encoder 113 and a destination of the content data encoded by the data duplicator 253. In the embodiment, the destination setting section 265 sets the destination of one piece of content data on the broadcast station 159 and the destination of the other piece of content data on the wireless communication terminal 200. Even in the embodiment, the content data whose destination is set to the own terminal are handled as feedback data. Further, the content data whose destination is set on the broadcast station 159 are handled as "broadcast data."

Figure 5:
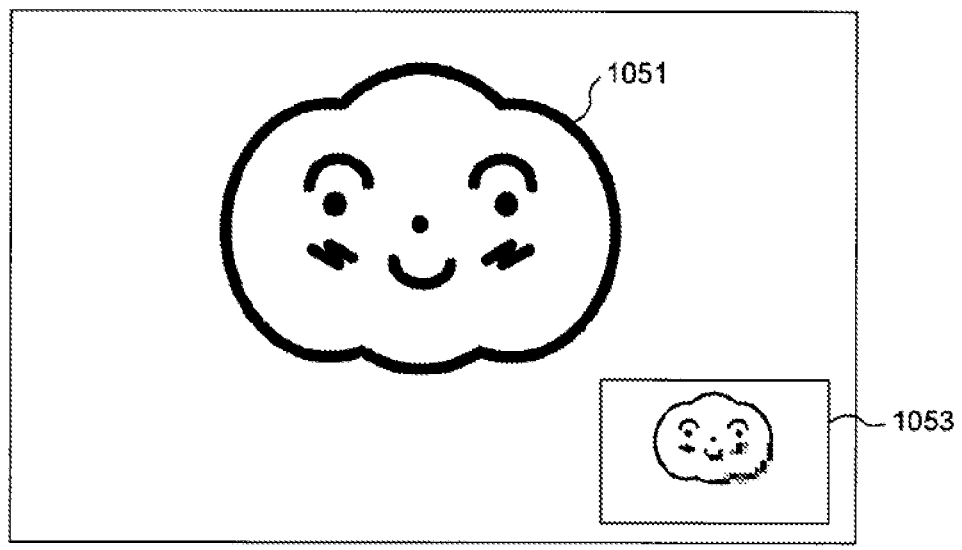
FIG. 5 is a diagram showing an example image to be displayed on a display.

The transmission IF 281 transmits both the feedback data and the broadcast data in parallel virtually simultaneously in the form of a packet. The output section 273 is an interface that outputs data to the display 153 connected to the wireless communication terminal 200 such that data, which are generated by means of the reproduction processor 121 decoding the feedback data received by the reception IF 133, and the content data read from the buffer 251 are subjected to reproduction processing in synchronism with each other. FIG. 5 is a diagram showing an example image to be displayed on the display 153. As shown in FIG. 5, an image 1051 of the content data read from the buffer 251 is displayed in a main screen of the display 153, and an image of the data generated by decoding the feedback data is displayed in a lower right sub-screen 1053.

Figure 6:
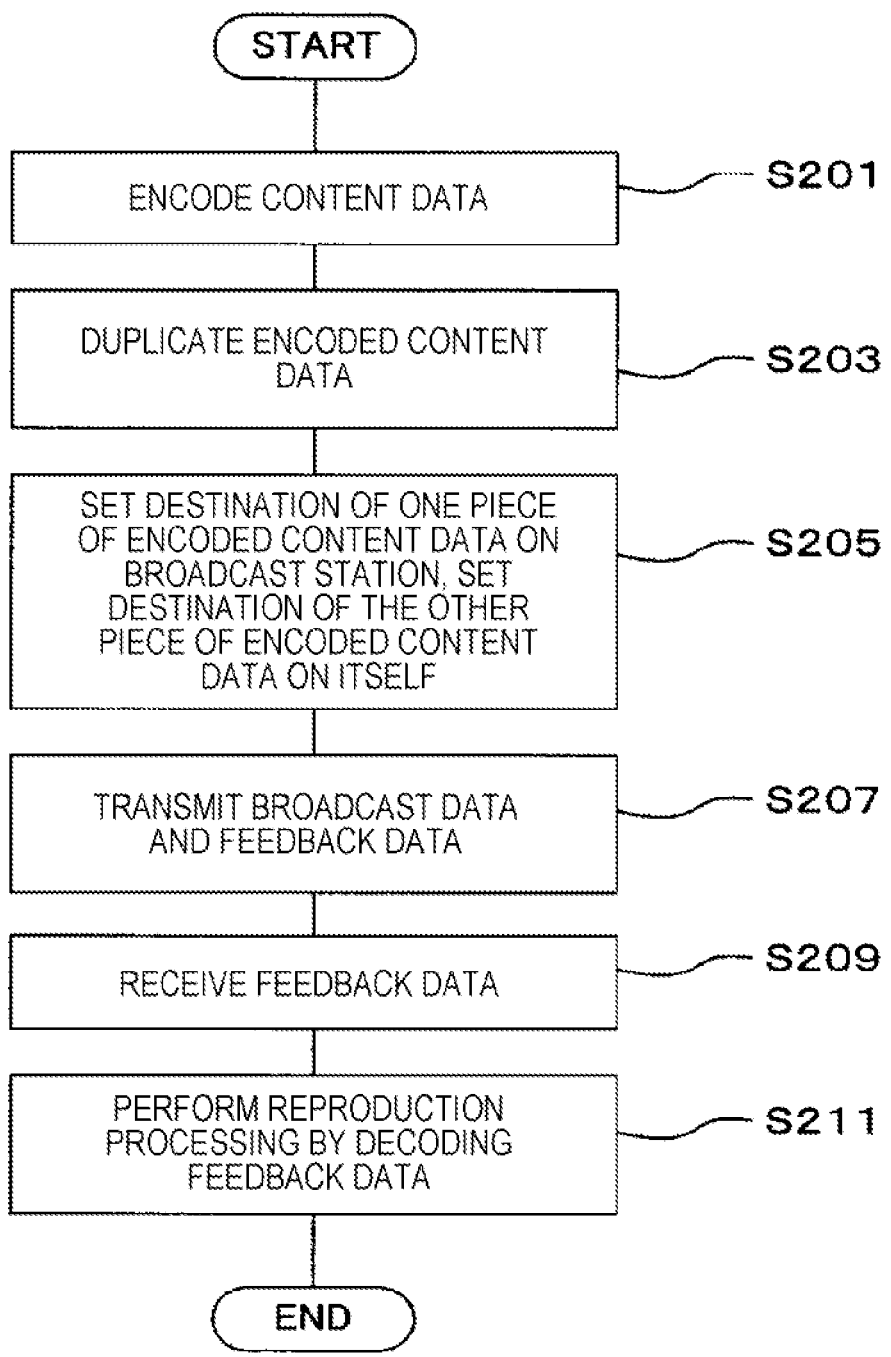
FIG. 6 is a flowchart showing example operation of the wireless communication terminal according to the second embodiment.

FIG. 6 is a flowchart showing example operation of the wireless communication terminal according to the second embodiment. In the example shown in FIG. 6, in order to ascertain a state of images and sounds which will be reproduced by the broadcast station 159, transmission and reception of the feedback data are carried out concurrently with transmission of content data from the wireless communication terminal 200 to the broadcast station 159.

As shown in FIG. 6, the encoder 113 encodes the content data input to the input section 111 (step S201). Next, the data duplicator 253 duplicates the encoded content data (step S203). The destination setting section 265 then sets a destination of one piece of encoded content data on the broadcast station 159 and a destination of the other piece of encoded content data on the own terminal (step S205). Subsequently, the content data whose destination is set on the broadcast station 159 are handled as broadcast data, whilst the content data whose destination is set on the own terminal are handled as feedback data. Next, the transmission IF 281 transmits the broadcast data and the feedback data (step S207).

The reception IF 133 receives the feedback data that are transmitted from the wireless communication terminal 200 and transferred by way of the public wireless communication network and the base station 155 (step S209). Next, the reproduction processor 121 performs reproduction processing by decoding the feedback data received by the reception IF 133 (step S211). Since the content data reproduced by the reproduction processor 121 are reproduced on the display 153, the user of the wireless communication terminal ascertains a state of reproduction of the content data (image quality, skipping of sound, and the like).

As described above, in the embodiment, the user of the wireless communication network terminal 200 can ascertain a state (image quality, skipping of sound, and the like) in which the broadcast station 159 are reproducing the broadcast data propagated by way of the public wireless communication network. At this time, the feedback data are returned, without passing by the broadcast station 159, by way of the public wireless communication network in which the data are most susceptible to influence in view of communication quality. Therefore, the wireless communication terminal 200 can quickly receive the feedback data that have undergone the same degree of influence as that the broadcast data undergo in the course of transmission.

Third Embodiment

Figure 7:
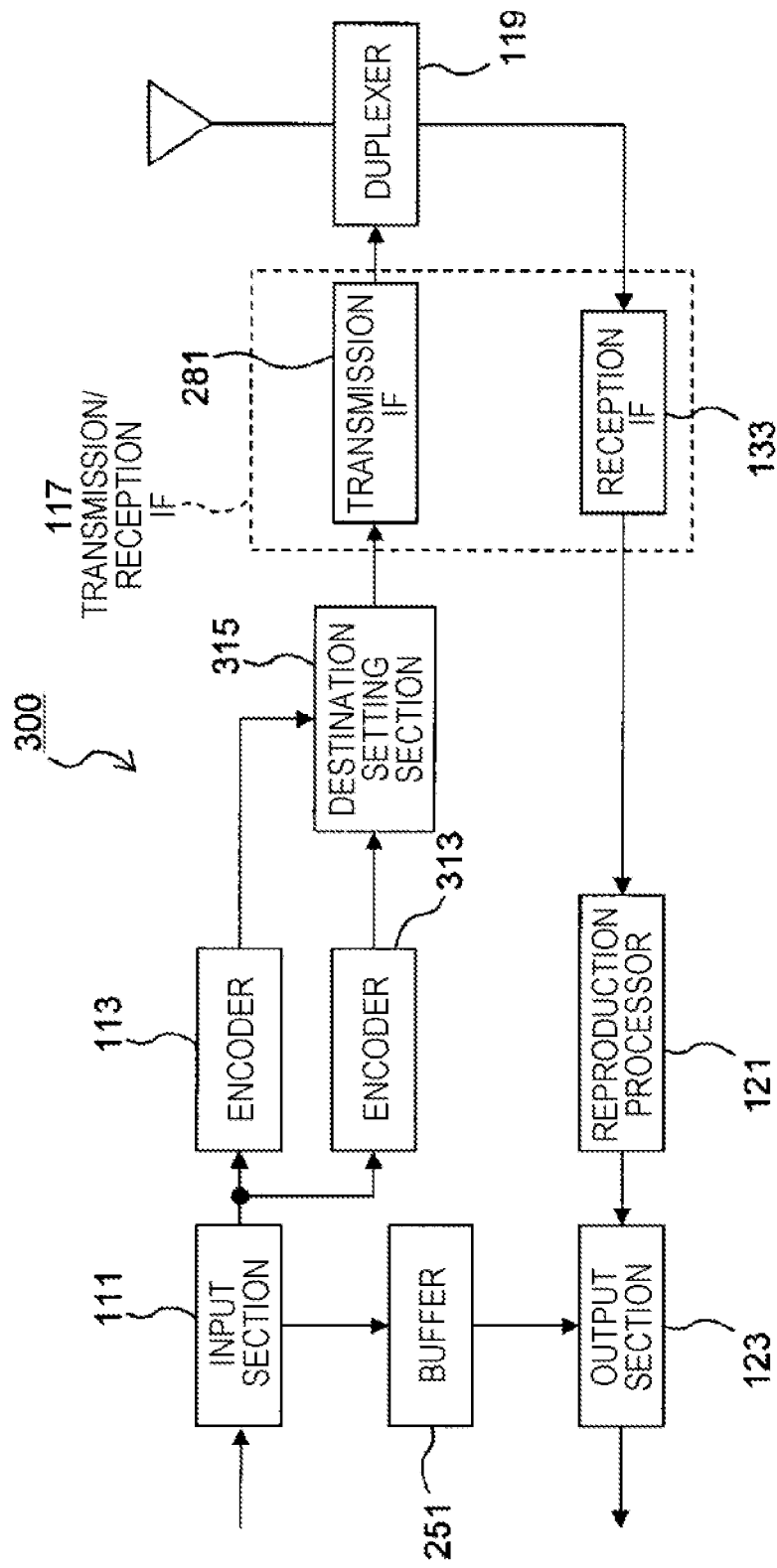
FIG. 7 is a block diagram showing an internal configuration of the wireless communication terminal according to a third embodiment.

A communication network system in which a wireless communication terminal 300 according to a third embodiment is placed is analogous to that described in connection with the first embodiment. FIG. 7 is a block diagram showing an internal configuration of the wireless communication terminal according to the third embodiment. As shown in FIG. 7, the wireless communication terminal 300 according to the third embodiment differs from the wireless communication terminal 200 according to the second embodiment in that the wireless communication terminal 300 has another encoder 313 in place of the data duplicator 253 and that a destination setting section 315 operates differently when compared with the destination setting section 265 according to the second embodiment. The third embodiment is analogous to the second embodiment except for them, and constituents that are common between FIG. 7 and FIG. 4 are assigned the same reference numerals.

The encoder 313 encodes content data that are identical with those input to the input section 111 in the same way as does the encoder 113. In this regard, a parameter used when the encoder 313 performs encoding operation (i.e., an encoding parameter) is different from a parameter employed when the encoder 113 performs encoding operation. Specifically, the encoding parameter of the encoder 313 and the encoding parameter of the encoder 113 are set such that, when the same content data are encoded, a volume of data encoded by the encoder 313 becomes smaller than a volume of data encoded by the encoder 113. The encoding parameter includes a compression rate, a frame rate, a resolution, and others.

The destination setting section 315 sets a destination of the content data encoded by the encoder 113 and a destination of the content data encoded by the encoder 313. In the embodiment, the designation setting section 315 sets on the broadcast station 159 a destination of the content data that are encoded by the encoder 113 and that have a large volume, setting on the wireless communication terminal 300 the destination of the content data that are encoded by the encoder 313 and that have a small volume. Even in the embodiment, the content data whose destination is set on the own terminal are handled as feedback data. In addition, the content data whose destination is set on the broadcast station 159 are handled as "broadcast data." The transmission IF 281 transmits both the feedback data and the broadcast data virtually simultaneously in the form of a packet.

Figure 8:
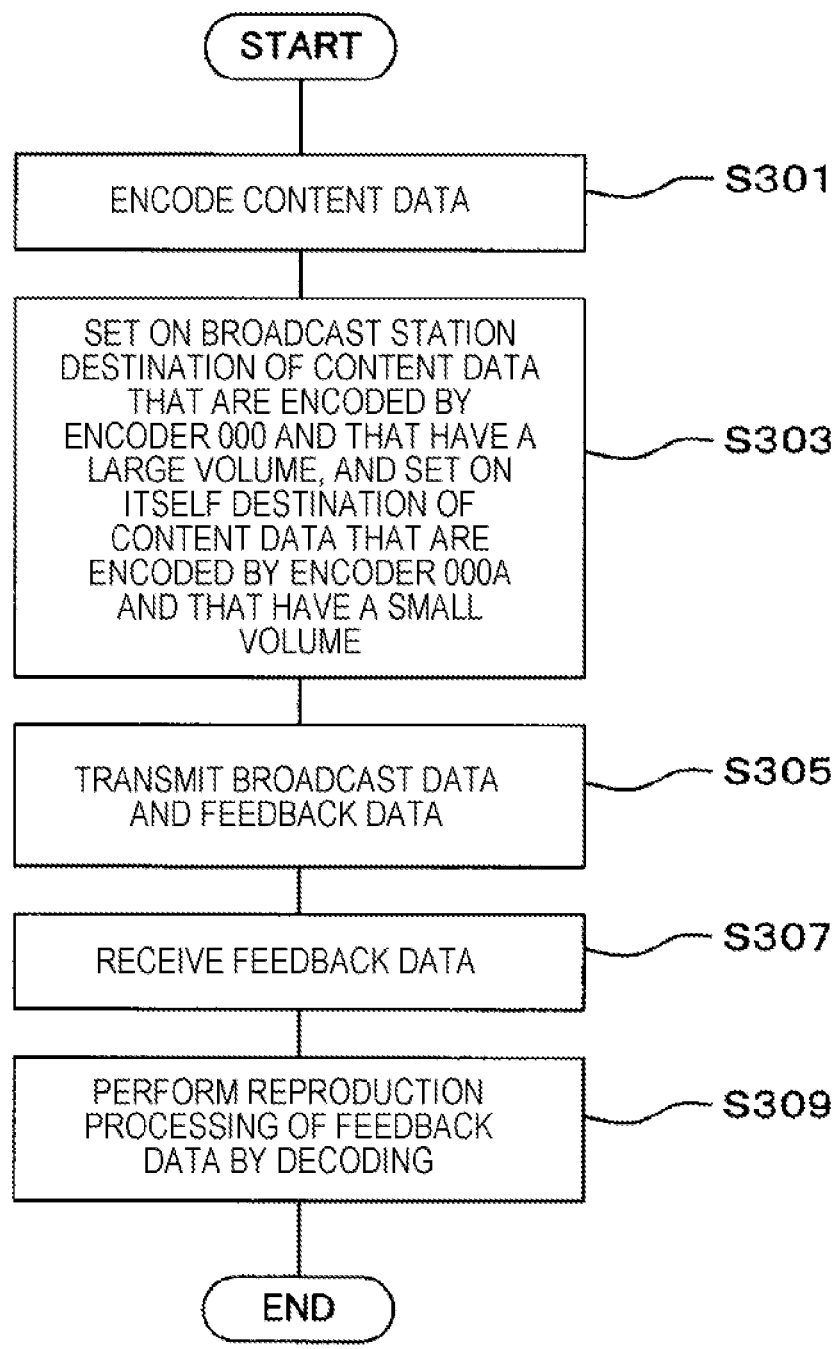
FIG. 8 is a flowchart showing example operation of the wireless communication terminal according to the third embodiment.

FIG. 8 is a flowchart showing example operation of the wireless communication terminal according to the third embodiment. In the example shown in FIG. 8, in order to ascertain a state of images and sounds which will be reproduced by the broadcast station 159, transmission and reception of the feedback data are carried out concurrently with transmission of content data from the wireless communication terminal 300 to the broadcast station 159.

As shown in FIG. 8, the encoder 113 and the encoder 313 encode the content data input to the input section 111 (step S301). The destination setting section 315 then sets a destination of the high-volume content data encoded by the encoder 113 on the broadcast station 159 and a destination of the low-volume content data encoded by the encoder 313 on the own terminal (step S303). Subsequently, the content data whose destination is set on the broadcast station 159 are handled as broadcast data, whilst the content data whose destination is set on the own terminal are handled as feedback data. Next, the transmission IF 281 transmits the broadcast data and the feedback data (step S305).

The reception IF 133 receives the feedback data that are transmitted from the wireless communication terminal 300 and transferred by way of the public wireless communication network and the base station 155 (step S307). Next, the reproduction processor 121 performs reproduction processing by decoding the feedback data received by the reception IF 133 (step S309). Since the content data reproduced by the reproduction processor 121 are reproduced on the display 153, the user of the wireless communication terminal ascertains a state of reproduction of the content data (image quality, skipping of sound, and the like).

A total volume of the broadcast data and the feedback data transmitted from the transmission IF 281 is twice the volume of data transmitted when only the broadcast data are transmitted, because the content data are duplicated in the second embodiment. In the embodiment, the encoding parameter of the encoder 113 and an encoding parameter of the encoder 313 are different from each other. Since the volume of feedback data is smaller than the volume of broadcast data, the total volume of broadcast data and feedback data transmitted from the transmission IF 281 is smaller than that transmitted in the second embodiment. Since a large volume of data requires a wide frequency bandwidth, the frequency bandwidth used in the embodiment for transmitting the broadcast data and the feedback data can be made narrower than that employed in the second embodiment.

Even in the embodiment, only the feedback data can be transmitted in the same way as in the first embodiment. In this case, since the volume of feedback data is smaller than that used in the first embodiment, the bandwidth used for transmitting feedback data can be made narrower than that used in the first embodiment.

Fourth Embodiment

Figure 9:
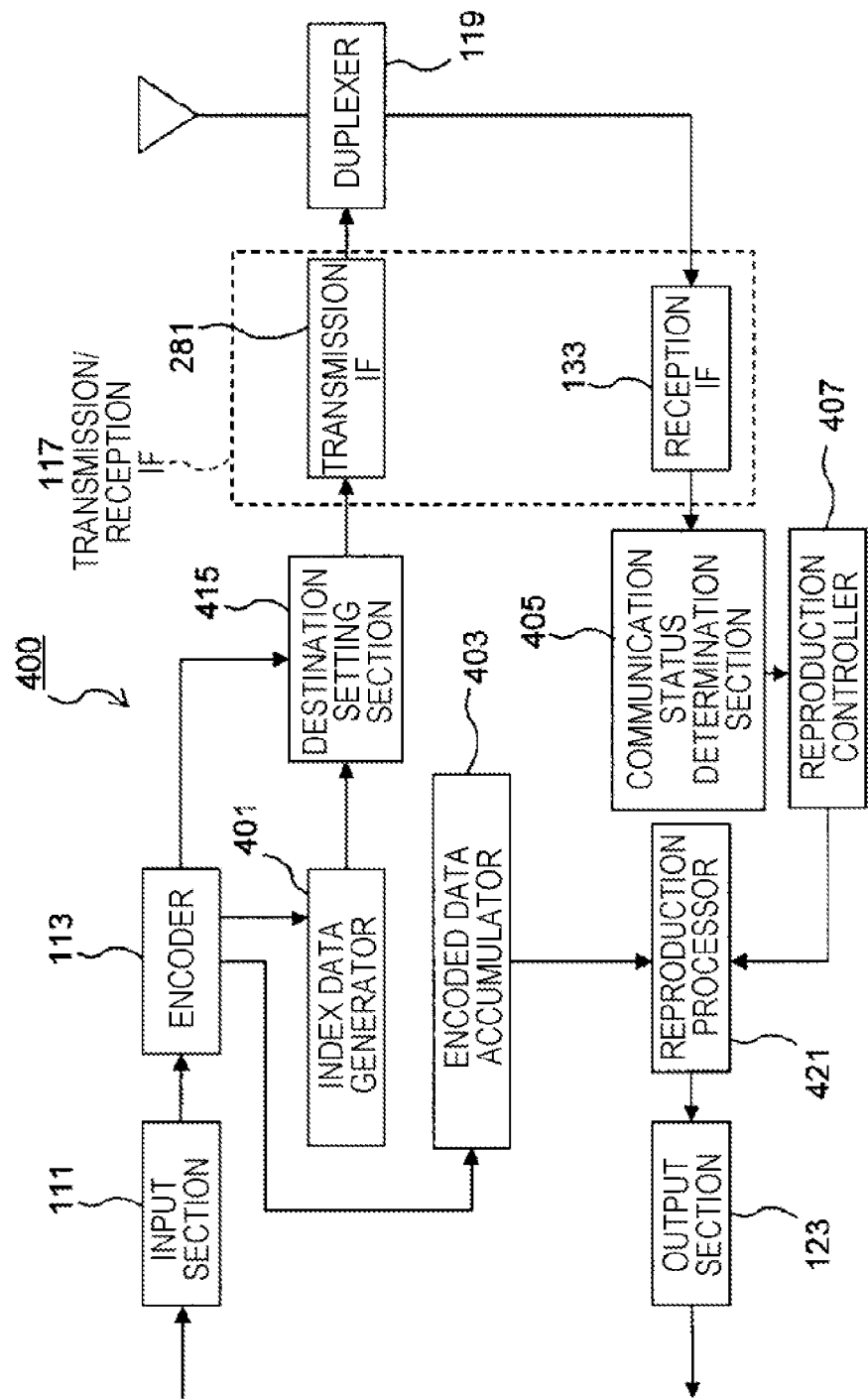
FIG. 9 is a block diagram showing an internal configuration of the wireless communication terminal according to a fourth embodiment.

A communication network system in which a wireless communication terminal 400 according to a fourth embodiment is placed is analogous to that described in connection with the example shown in FIG. 1. FIG. 9 is a block diagram showing an internal configuration of the wireless communication terminal according to the fourth embodiment. As shown in FIG. 9, the wireless communication terminal according to the fourth embodiment differs from the wireless communication terminal 200 according to the second embodiment in that the wireless communication terminal 400 has an index data generator 401 in place of the data duplicator 253; that the wireless communication terminal 400 additionally has an encoded data accumulator 403, a communication status determination section 405, and a reproduction controller 407; and that a destination setting section 415 and a reproduction processor 421 operate differently when compared with the destination setting section 265 and the reproduction processor 121 according to the second embodiment. The fourth embodiment is analogous to the second embodiment except for them, and constituents that are common to FIG. 9 and FIG. 4 are assigned the same reference numerals.

The index data generator 401 generates index data including information that is necessary for the wireless communication terminal 400 to analyze influence (a delay, a packet loss, and the like) which data transmitted from the wireless communication terminal 400 undergo in the public wireless communication network.

The destination setting section 415 sets a destination of the content data encoded by the encoder 113 and a destination of index data generated by the index data generator 401. In the embodiment, the destination setting section 451 sets a destination of the content data on the broadcast station 159 and a destination of the index data on the wireless communication terminal 400. Even in the embodiment, the index data whose destination is set on the own terminal are handled as feedback data. Further, the content data whose destination is set on the broadcast station 159 are handled as "broadcast data." The transmission IF 281 transmits only the feedback data or both the feedback data and the broadcast data in parallel simultaneously in the form of a packet.

Figure 10:
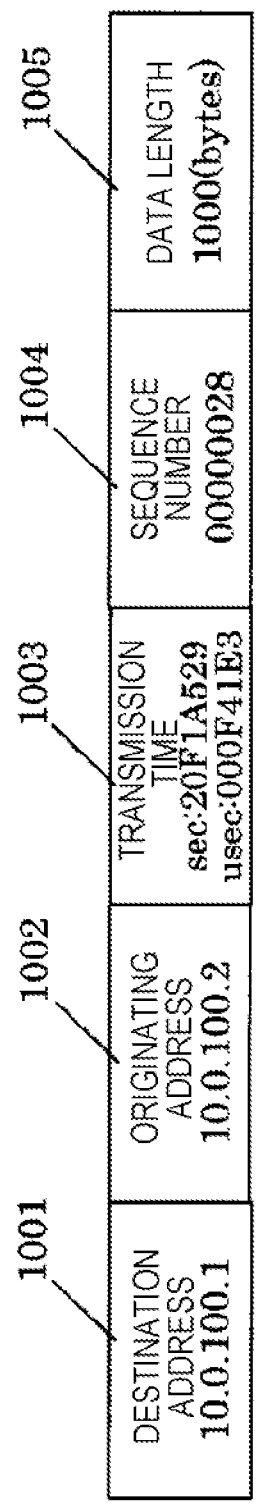
FIG. 10 is a diagram showing a header of index data whose destination is set on a destination setting section.

FIG. 10 is a diagram showing a header of the index data whose destination is set on the destination setting section 415. As shown in FIG. 10, the header of the index data includes various pieces of information, such as a destination address 1001, an originating address 1002, a transmission time 1003, a sequence number 1004, and a data length 1005. The destination address 1001 is an address assigned to the reception IF 133. The originating address 1002 is an address allocated to the transmission IF 281. The transmission time 1003 is a time at which the index data are transmitted from the wireless communication terminal. The sequence number 1004 is a serial number for ascertaining a packet sequence or occurrence of a missing packet. The data length 1005 shows a data length of the index data. In this respect, the destination address 1001 and the originating address 1002 are information to be set by the destination setting section 415, and the transmission time 1003, the sequence number 1004, and the data length 1005 are information to be imparted by the index data generator 401.

Timing at which the index data generator 401 generates index data is of two types. One type of timing is periodic timing. The other type of timing is one which is virtually synchronized with timing at which the encoder 113 encodes content data. The user of the wireless communication terminal 400 can previously set which one of the two types of timing should be employed when the index data generator 401 generates index data in the course of the broadcast data being transmitted by the wireless communication terminal 400. In this regard, in a stage prior to transmission of the broadcast data to the broadcast station 159, the index data generator 401 selects a mode in which index data are generated at periodic timing.

If set so as to generate index data at periodic timing, the index data generator 401 will generate index data even when the encoder 113 is not yet encoded content data. At this time, even when the transmission IF 281 can transmit only the feedback data in a stage prior to transmission of the broadcast data to the broadcast station 159 or periodically transmit the feedback data during transmission of the broadcast data to the broadcast station 159.

When index data are generated virtually in synchronism with encoding of the content data, the index data generation 401 generates index data having a data size which is commensurate with the volume of encoded content data. A value that is determined by averaging sizes of the encoded data at predetermined time intervals can also be used as a data size of index data. The transmission IF 281 at this time transmits the feedback data along with transmission of the broadcast data.

The encoded data accumulator 403 accumulates the content data encoded by the encoder 113. The communication status determination section 405 analyzes the feedback data received by the reception IF 133, determining a communication status of the wireless communication terminal 400 that includes a radio environment of the public wireless communication network. Incidentally, determination accuracy of the communication status determination section 405 varies depending on timing to generate index data. Specifically, compared with a case where index data are generated at periodic timing, a higher degree of determination accuracy is accomplished when the index data are generated at timing virtually synchronized with timing at which the encoder 113 encodes content data.

FIG. 11 shows example feedback data received by the reception IF 133. In the example shown in FIG. 11(*a*), the communication status determination section 405 analyzes a sequence number, determining a communication status from an average packet loss rate of the index data. In this example, the index data are transmitted at the same timing when the broadcast data are transmitted. The index data are given transmission timing and a data size, which are virtually identical with those of the broadcast data, and the same sequence number as that allocated to the broadcast data. In the example shown in FIG. 11(*a*), packets of sequence numbers 4, 7, and 8 are not received. Hence, the packets may be lost or delayed in the public wireless communication network.

In the meantime, in the example shown in FIG. 11(*b*), the communication status determination section 405 analyzes the sequence number and a difference between a transmission time and a receiving time, determining a communication status from a packet loss rate of the index data and an average transmission delay time. In the example, the index data are transmitted at timing prior to transmission of the broadcast data, and the index data are given a sequence number that is different from a sequence number of the broadcast data. In the example shown in FIG. 11(*b*), since the packet of the sequence number 104 is not yet received, the packet may be lost or delayed in the public wireless communication network.

In accordance with the communication status rendered by the communication status determination section 405, the reproduction controller 407 controls reproduction processing of encoded data that is performed by the reproduction processor 421. The reproduction processor 421 reads the encoded content data from the encoded data accumulator 403 and performs reproduction processing under control of the reproduction controller 407 by decoding the thus-read encoded content data. In response to control of the reproduction controller 407, the reproduction processor 421 performs reproduction processing while a portion of the decoded content data is lost. The reproduction controller 407 at this time determines a loss factor in accordance with the communication status.

Like the example shown in FIG. 11(*a*), when a packet with sequence number 4, for instance, is determined to be lost from a result of the communication status of the feedback data acquired at the time of transmission of the index data at virtually the same timing when the broadcast data are transmitted, the reproduction controller 407 performs control such that data with sequence number 4 in the encoded content data are not subjected to reproduction processing.

Figure 12:
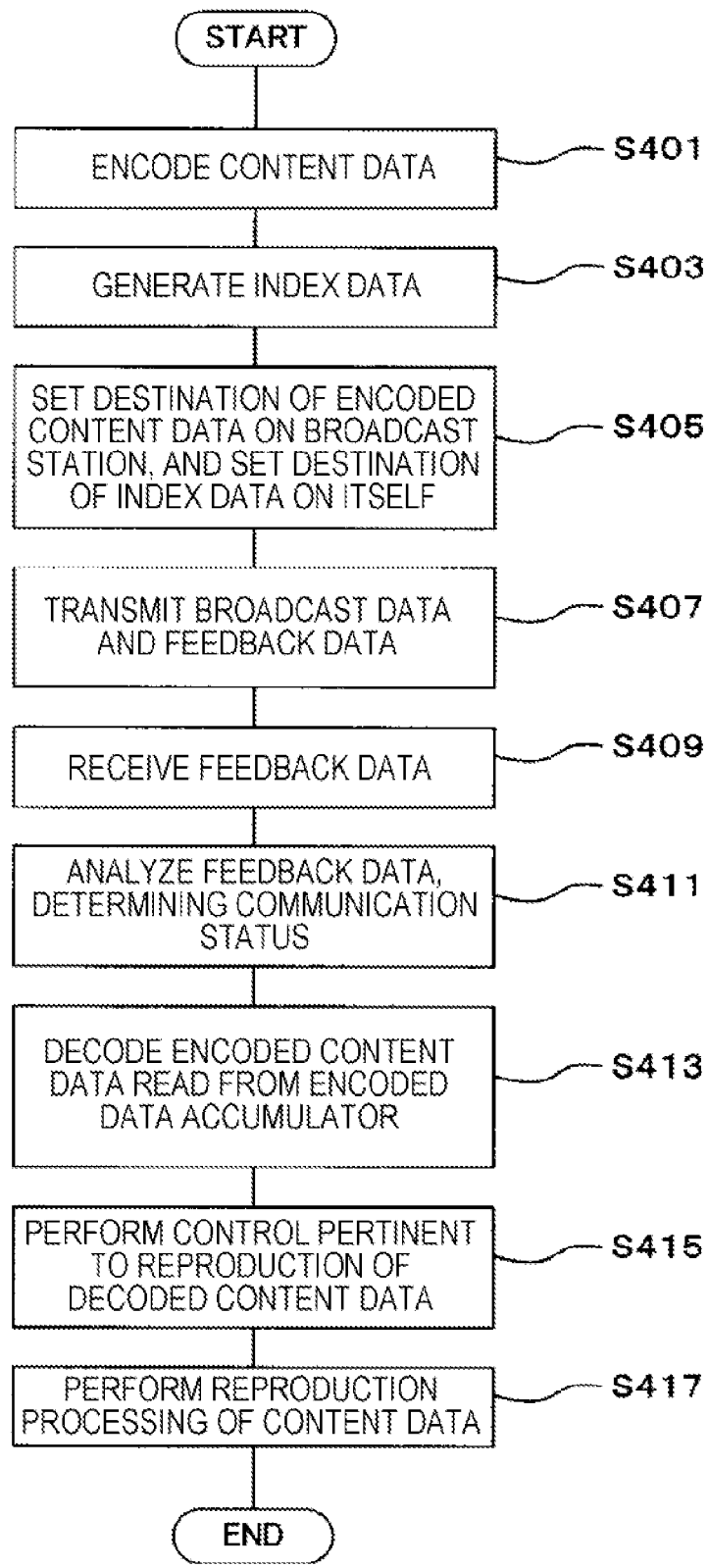
FIG. 12 is a flowchart showing example operation of the wireless communication terminal according to a fourth embodiment.

FIG. 12 is a flowchart showing example operation of the wireless communication terminal according to the fourth embodiment. In the example shown in FIG. 12, in order to ascertain a state of images and sounds which will be reproduced by the broadcast station 159, transmission and reception of the feedback data are carried out concurrently with transmission of content data from the wireless communication terminal 400 to the broadcast station 159. The index data generator 401, in other words, is set so as to generate index data virtually in synchronism with encoding of content data performed by the encoder 113.

As shown in FIG. 12, the encoder 113 encodes content data input to the input section 111 (step S401). Next, the index data generator 401 generates index data virtually in synchronism with step S401 (step S403). The destination setting section 415 then sets a destination of encoded content data on the broadcast station 159 and a destination of the index data on the own terminal (step S405). Subsequently, the content data whose destination is set on the broadcast station 159 are handled as broadcast data, whilst the content data whose destination is set on the own terminal are handled as feedback data. Next, the transmission IF 281 transmits the broadcast data and the feedback data (step S407).

The reception IF 133 receives the feedback data that are transmitted from the wireless communication terminal 400 and transferred by way of the public wireless communication network and the base station 155 (step S409). The communication status determination section 405 analyzes the feedback data, determining a communication status of the wireless communication terminal 400 that includes a radio environment of the public wireless communication network (step S411). Next, the reproduction processor 421 reads the encoded content data from the encoding data accumulator 403, decoding the thus-read encoded content data (step S413). The reproduction controller 407 then controls reproduction processing the data decoded by the reproduction processor 421 in accordance with the communication status acquired in step S411 (step S415). Subsequently, the reproduction processor 421 performs reproduction processing of the content data under control pertinent to step S415 (step S417). Since the content data decoded by the reproduction processor 421 are reproduced on the display 153, the user of the wireless communication terminal 400 ascertains a state of reproduction of the content data (image quality, skipping of sounds, and the like).

As described above, in the embodiment, a state in which the content data propagated through the public wireless communication network are reproduced by the broadcast station 159 can be ascertained before transmission of the broadcast data or immediately after transmission of the broadcast data in accordance with images and/or sounds reproduced in a pseudo manner from a result of analysis of the feedback data (index data) acquired by way of the public wireless communication network. As mentioned above, since the index data are used, the wireless communication terminal 400 does not need to have a plurality of encoders 113. The encoder 113 is greater than the index data generator 401 in terms of cost and power consumption. For this reason, particularly compared with the wireless communication terminal 300 according to the third embodiment, the wireless communication terminal 400 of the embodiment can lower cost and power consumption.

Fifth Embodiment

Figure 13:
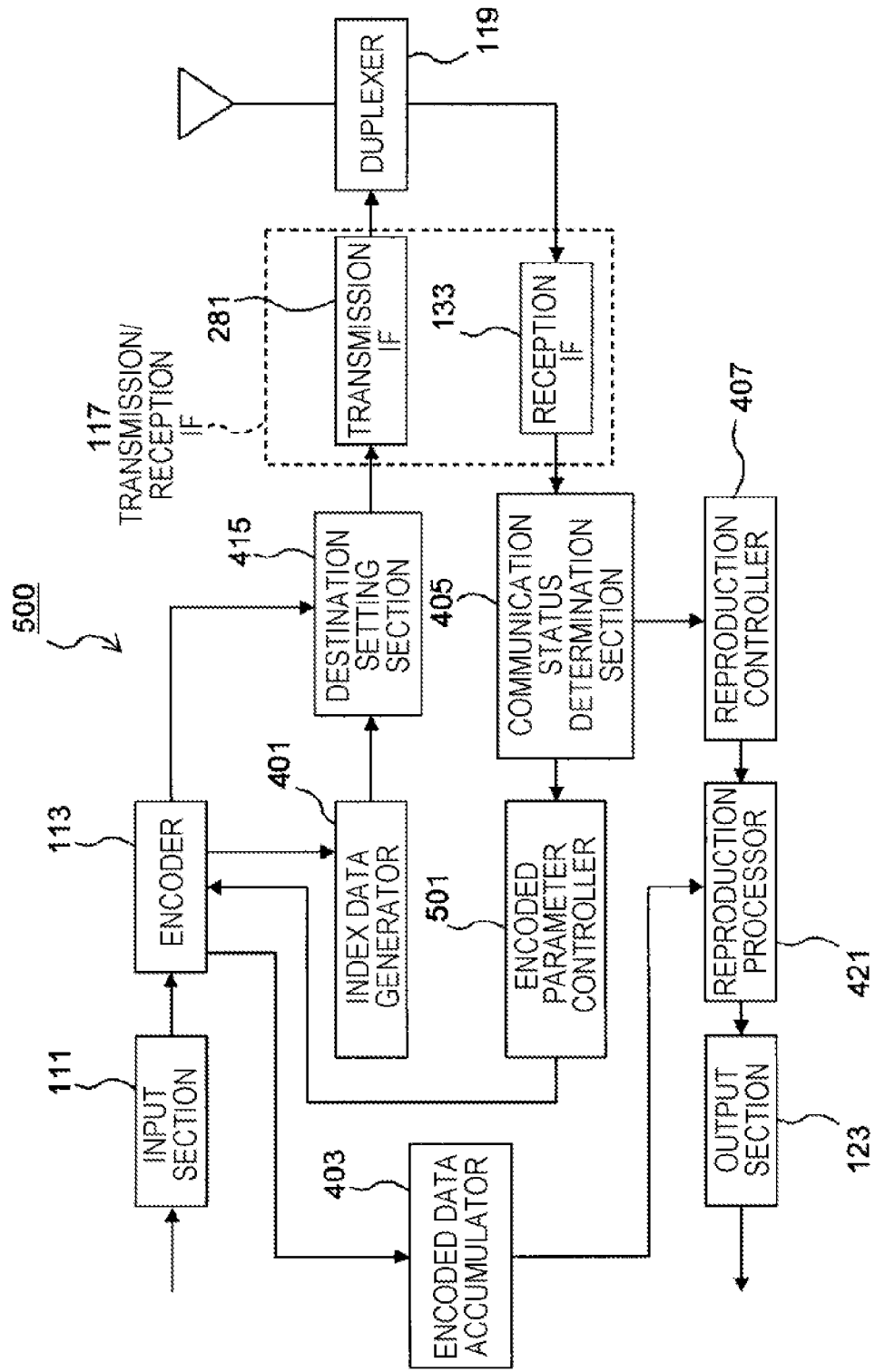
FIG. 13 is a block diagram showing an internal configuration of the wireless communication terminal according to a fifth embodiment.

A communication network system in which a wireless communication terminal 500 according to a fifth embodiment is placed is analogous to that described in connection with the example shown in FIG. 1. FIG. 13 is a block diagram showing an internal configuration of the wireless communication terminal according to the fifth embodiment. As shown in FIG. 13, the wireless communication terminal 500 according to the fifth embodiment differs from the wireless communication terminal 400 according to the fourth embodiment in that the wireless communication terminal 500 additionally has an encoding parameter controller 501. The fifth embodiment is analogous to the fourth embodiment except for them, and constituents that are common to FIG. 13 and FIG. 9 are assigned the same reference numerals.

The encoding parameter controller 501 controls the encoding parameter of the encoder 113 in accordance with the communication status determined by the communication status determination section 405. The encoding parameter includes a compression rate, a frame rate, a resolution, and others. The communication status determined by the communication status determination section 405 is based on a packet loss rate or a transmission delay time. When the packet loss rate is a predetermined value or more or when a change rate of a transmission delay time is positive, the encoding parameter controller 501 performs control so as to lower the encoding parameter of the encoder 113. In this respect, the phrase "lowering the encoding parameter" means an increase in compression rate, a decrease in frame rate, or a decrease in resolution. Since lowering the encoding parameter leads to a decrease in the volume of broadcast data, a probability of occurrence of a packet loss or delay of the broadcast data in the public wireless communication network can be lowered.

Figure 14:
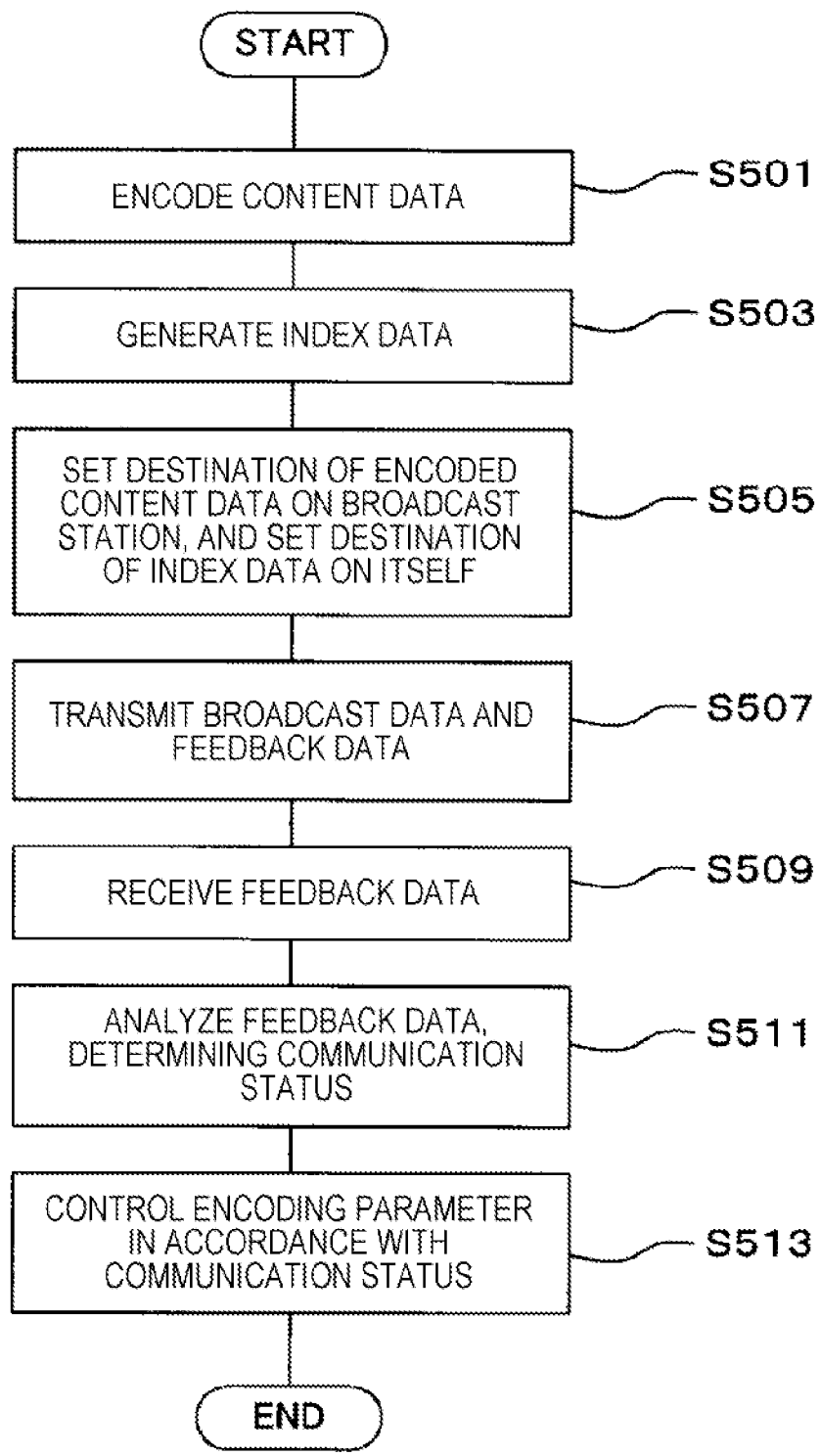
FIG. 14 is a flowchart showing example operation of the wireless communication terminal according to a fifth embodiment.

FIG. 14 is a flowchart showing example operation of the wireless communication terminal according to the fifth embodiment. In the example shown in FIG. 14, transmission and reception of the feedback data are carried out simultaneously with transmission of the content data to the broadcast station 159 from the wireless communication terminal 500. Specifically, the index data generator 401 is set so as to generate index data virtually in synchronism with encoding of the content data performed by the encoder 113.

As shown in FIG. 14, the encoder 113 encodes the content data input to the input section 111 by means of a predetermined encoding parameter (step S501). The index data generator 401 then generates index data virtually in synchronism with step S501 (step S503). Next, the destination setting section 415 sets a destination of the encoded content data on the broadcast station 159, setting a destination of the index data on the own terminal (step S505). Subsequently, the content data whose destination is set on the broadcast station 159 are handled as broadcast data, whilst the content data whose destination is set on the own terminal are handled as feedback data. Next, the transmission IF 281 transmits the broadcast data and the feedback data (step S507).

The reception IF 133 receives the feedback data that are transmitted from the wireless communication terminal 500 and transferred by way of the public wireless communication network and the base station 155 (step S509). The communication status determination section 405 analyzes the feedback data, determining a communication status of the wireless communication terminal 400 that includes a radio environment of the public wireless communication network (step S511). Next, in accordance with the communication status determined in step S511, the encoding parameter controller 501 controls an encoding parameter employed when the encoder 113 performs encoding in step S501 (step S513). Even in the embodiment, processing pertinent to steps S413 to S417 shown in FIG. 12 in connection with the fourth embodiment can also be performed in parallel with processing pertinent to step S513.

As above, in the embodiment, in accordance with the communication status based on a result of analysis of the feedback data (index data) acquired by way of the public wireless communication network, the encoder 113 can change an encoding parameter employed when encoding content data. Therefore, simultaneously transmitting the feedback data and the broadcast data, the wireless communication terminal can transmit a volume of broadcast data commensurate with the communication status.

Sixth Embodiment

Figure 15:
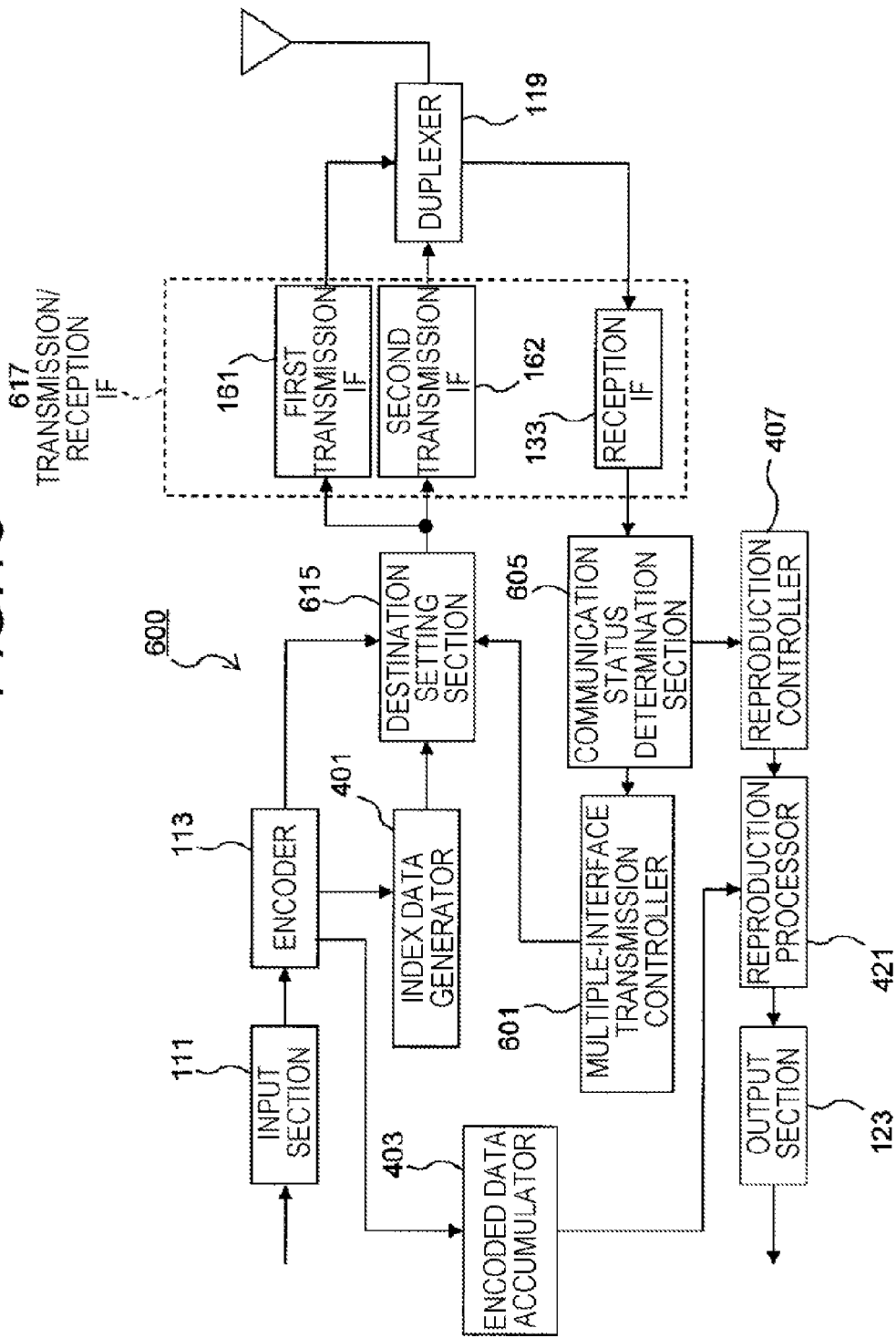
FIG. 15 is a block diagram showing an internal configuration of the wireless communication terminal according to a sixth embodiment.

A communication network system in which a wireless communication terminal 600 according to a sixth embodiment is placed is analogous to that described in connection with the example shown in FIG. 1. FIG. 15 is a block diagram showing an internal configuration of the wireless communication terminal according to the sixth embodiment. As shown in FIG. 15, the wireless communication terminal 600 according to the sixth embodiment differs from the wireless communication terminal 400 according to the fourth embodiment in that the wireless communication terminal 600 additionally has a multiple-interface transmission controllers 601; that the configuration of a transmission/reception IF 617 is different from the configuration of the transmission/reception IF 117 according to the fourth embodiment; and that a destination setting section 615 and a communication status determination section 605 operate differently when compared with the destination setting section 415 and the communication status determination section 405 according to the fourth embodiment. The sixth embodiment is analogous to the fourth embodiment except for them, and constituents that are common to FIG. 15 and FIG. 9 are assigned the same reference numerals.

In contrast with the embodiment, the transmission/reception IF 617 of the embodiment has a plurality of transmission interfaces that logically differ from each other. The respective transmission interfaces conform to wireless communication standards of different communication carriers. In the embodiment, as shown in FIG. 15, the transmission/reception IF 617 has a first transmission interface (a first transmission IF) 161, a second transmission interface (a second transmission IF) 162, and the reception IF 133. The first transmission IF 161, the second transmission IF 162, and the reception IF 133 are physically identical with but logically different from the transmission/reception IF 617. To be specific, different addresses are respectively set on the first transmission IF 161, the second transmission IF 162, and the reception IF 133.

The destination setting section 615 of the embodiment sets a destination of the content data encoded by the encoder 113 and a destination of the index data generated by the index data generator 401. Even in the embodiment, the destination setting section 615 sets the destination of the content data on the broadcast station 159, setting the destination of the index data on the wireless communication terminal 600. The content data whose destination is set on the own terminal are handled as feedback data, and the content data whose destination is set on the broadcast station 159 are handled as "broadcast data."

The destination setting section 615 of the embodiment makes settings such that the feedback data are transmitted concurrently from the first transmission IF 161 and the second transmission IF 162. As a consequence, the reception IF 133 receives two types of feedback data by way of respective wireless communication networks of two different communication carriers. Further, the destination setting section 615 makes settings such that the broadcast data are transmitted in a mode commanded by the multiple-interface transmission controller 601.

The communication status determination section 605 of the embodiment analyses the two types of feedback data received by the reception IF 133, thereby determining communication statuses of the wireless communication terminal 600 including radio environments of the wireless communication networks of the respective communication carriers. The communication statuses determined by the communication status determination section 605 are based on a packet loss rate or a transmission delay time.

The multiple-interface transmission controller 601 controls a transmission mode for the broadcast data in accordance with the communication statuses determined by the communication status determination section 605. Specifically, the multiple-interface transmission controller 601 commands the destination setting section 615 such that the broadcast data are transmitted in a prioritized manner from the transmission IF from which the feedback data with a superior communication status was transmitted (hereinafter called a "priority transmission IF"). For instance, the multiple-interface transmission controller 601 issues a command such that the broadcast data are transmitted solely from the priority transmission IF. Further, the multiple-interface transmission controller 601 can also issue a command such that a portion of the broadcast data is preferentially output from the priority transmission IF and that a remaining portion of the broadcast data is transmitted from the other transmission IF. For example, the command may be transmitting three-fourths of the broadcast data from the priority transmission IF and transmitting a remaining quarter broadcast data from the other transmission IF. A proportion of transmission can also be changed in accordance with the communication status.

When the broadcast data are data that have a high real-time characteristic such as images and sounds, the multiple-interface transmission controller 601 may give priority to the transmission IF that exhibits a small value of transmission delay. When the broadcast data are image data that give priority to image quality, or the like, the multiple-interface transmission controller 601 may also give priority to the transmission IF that exhibits a small packet loss rate.

Figure 16:
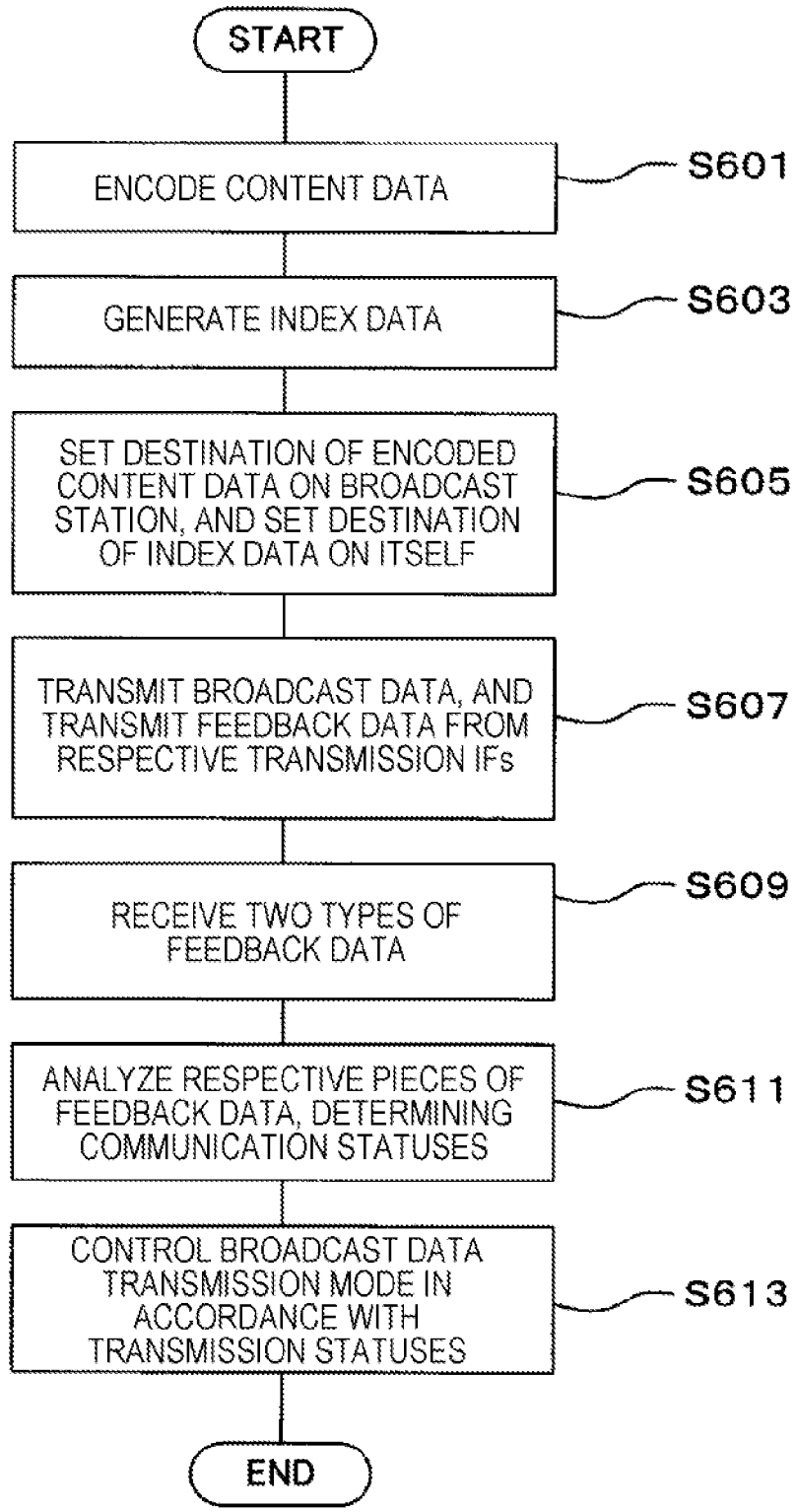
FIG. 16 is a flowchart showing example operation of the wireless communication terminal according to the sixth embodiment.
Figure 17:
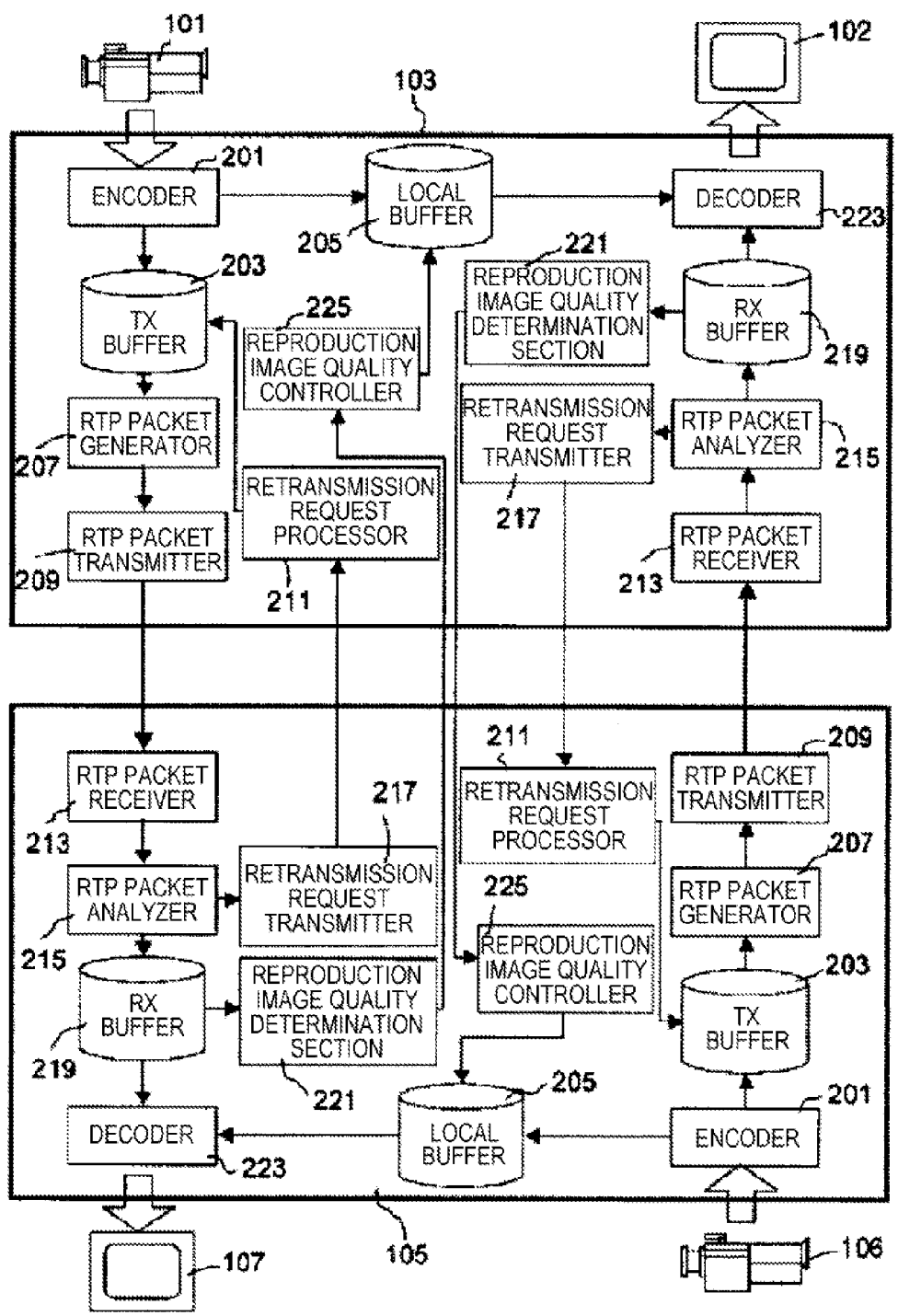
FIG. 17 is a diagram showing an example internal configuration of a network terminal described in connection with Patent Literature 1.

FIG. 16 is a flowchart showing example operation of the wireless communication terminal according to the sixth embodiment. In the example shown in FIG. 16, transmission and reception of the feedback data are performed simultaneously with transmission of the content data to the broadcast station 159 from the wireless communication terminal 600. To be specific, the index data generator 401 is set so as to generate index data virtually in synchronism with encoding of the content data performed by the encoder 113.

As shown in FIG. 16, the encoder 113 encodes content data input to the input section 111 (step S601). Next, the index data generator 401 generates index data virtually in synchronism with step S601 (step S603). The destination setting section 615 then sets a destination of encoded content data on the broadcast station 159 and a destination of the index data on the own terminal (step S605). Subsequently, the content data whose destination is set on the broadcast station 159 are handled as broadcast data, whilst the content data whose destination is set on the own terminal are handled as feedback data. Next, at least one of the first transmission IF 161 and the second transmission IF 162 transmits the broadcast data, and the first transmission IF 161 and the second transmission IF 162 transmit the feedback data (step S607).

The reception IF 133 then receives two types of feedback data that are transmitted from the wireless communication terminal 600 by way of the public wireless communication networks of different communication carriers (step S609). The communication status determination section 605 analyzes the respective pieces of feedback data, determining communication statuses of the wireless communication terminal 600 that include radio environments of the public wireless communication networks (step S611). Next, the multiple-interface transmission controller 601 controls a transmission mode for the broadcast data in accordance with the communication statuses determined in step S611 (step S613). Even in the embodiment, processing pertinent to steps S413 to S417 shown in FIG. 12 in connection with the fourth embodiment can also be performed in parallel with processing pertinent to step S613.

As above, in the embodiment, the broadcast data can be efficiently transmitted in accordance with the communication statuses of the wireless communication networks of respective communication carriers. Incidentally, in the embodiment, the transmission/reception IF 617 has two transmission IFs but can also have three transmission IFs or more.

Although the case where the present invention is implemented by hardware has been described as an example in each of the above embodiments, the present invention may be also implemented by software in conjunction with the hardware.

In addition, each functional block used in the description of each of the above embodiments can be implemented as an LSI, which is an integrated circuit, typically. Each functional block may be individually formed as one chip, or some or all of the functional blocks may be formed as one chip. Although the LSI is applied herein, the chip may also be referred to as an IC, a system LSI, a super LSI, and an ultra LSI depending on the degree of integration.

In addition, the method of circuit integration is not limited to the LSI, and may also be realized using a dedicated circuit or a general-purpose processor. After manufacturing the LSI, it is also possible to use a reconfigurable processor that can reconfigure connections or setting of circuit cells inside the LSI or a Field Programmable Gate Array (FPGA) that can be programmed.

In addition, when circuit integration technology to replace the LSI appears due to the advancement of semiconductor technology or another technology obtained from the semiconductor technology, it is also naturally possible to integrate functional blocks using the technology. Applications of biotechnology and the like are possible.

While the present invention has been described in detail with reference to the specific embodiments, it is apparent to those skilled in the art that various changes and modifications may be made without departing from the spirit and scope of the present invention.

This application is based on Japanese Patent Application No. 2011-167285 filed on Jul. 29, 2011, the contents of which are incorporated herein by reference.

INDUSTRIAL APPLICABILITY

The wireless communication terminal of the present invention is useful as a wireless communication terminal, or the like, that quickly acquires information about reproduction image quality of transmitted content data on a receiving device.

REFERENCE SIGNS LIST 100, 200, 300, 400, 500, 600: WIRELESS COMMUNICATION TERMINAL
151: VIDEO CAMERA
153: DISPLAY
155: BASE STATION
157: WIRED NETWORK
159: BROADCAST STATION
111: INPUT SECTION
113, 313: ENCODER
115, 265, 315, 415, 615: DESTINATION SETTING SECTION
117, 617: TRANSMISSION/RECEPTION INTERFACE (TRANSMISSION/RECEPTION IF)
131, 281: TRANSMISSION INTERFACE (TRANSMISSION IF)
133: RECEPTION INTERFACE (RECEPTION IF)
161: FIRST TRANSMISSION INTERFACE (FIRST TRANSMISSION IF)
162: SECOND TRANSMISSION INTERFACE (SECOND TRANSMISSION IF)
119: DUPLEXER
121, 421: REPRODUCTION PROCESSOR
123, 273: OUTPUT SECTION
251: BUFFER
253: DATA DUPLICATOR
401: INDEX DATA GENERATOR
403: ENCODED DATA ACCUMULATOR
405, 605: COMMUNICATION STATUS DETERMINATION SECTION
407: REPRODUCTION CONTROLLER
501: ENCODING PARAMETER CONTROLLER
601: MULTIPLE-INTERFACE TRANSMISSION CONTROLLER

The invention claimed is:

1. A wireless communication terminal for transmitting content data and feedback data to a determined content data destination and a determined feedback data destination, respectively, by way of a wireless communication network, the wireless communication terminal comprising:
   an encoding circuitry, which in operation, encodes the content data and outputs as encoded content data;
   destination setting circuitry, which in operation, sets a feedback data destination address for the wireless communication terminal, wherein the feedback data destination address is set on the wireless communication terminal;
   transmission circuitry, which in operation, transmits the encoded content data and the feedback data to the wireless communication network;
   reception circuitry, which in operation, receives the feedback data transmitted from the transmission circuitry and returned without passing by the determined content data destination; and
   reproduction processing circuitry, which in operation, performs reproduction processing on the content data in accordance with influence that the feedback data received by the reception circuitry undergo in a course of propagating in the wireless communication network without passing by the determined content data destination,
   wherein:
   the determined feedback data destination is a base station or a wired network, and
   the determined content data destination is a broadcast station.

2. The wireless communication terminal according to claim 1, wherein
   different network addresses are set on the transmission circuitry and the reception circuitry, respectively.

3. The wireless communication terminal according to claim 1, wherein
   the transmission circuitry transmits the feedback data along with the content data encoded by the encoding circuitry.

4. The wireless communication terminal according to claim 1, wherein
   the feedback data are the content data encoded by the encoding circuitry.

5. The wireless communication terminal according to claim 4, wherein:
   the content data being reproduction processed by the reproduction processing circuitry is contained in the feedback data received by the reception circuitry.

6. The wireless communication terminal according to claim 1, comprising
   data duplication circuitry, which in operation, duplicates the encoded content data, wherein
   the feedback data is data produced by the data duplication circuitry by duplicating the content data encoded by the encoding circuitry.

7. The wireless communication terminal according to claim 1, wherein
   the encoding circuitry includes first encoding circuitry, which in operation, encodes the content data by means of a first encoding parameter and second encoding circuitry, which in operation, encodes the content data by means of a second encoding parameter,
   a volume of data achieved when the second encoding circuitry encodes the content data is smaller than a volume of data achieved when the first encoding circuitry encodes the same content data, and
   the feedback data is data produced by the second encoding circuitry by encoding the content data.

8. The wireless communication terminal according to claim 1, comprising
   index data generation circuitry, which in operation, generates index data including information that is necessary for the wireless communication terminal to analyze influence that the feedback data transmitted from the transmission circuitry undergoes in the wireless communication network, wherein
   the feedback data is the index data generated by the index data generation circuitry.

9. The wireless communication terminal according to claim 8, comprising:
   communication status determination circuitry, which in operation, analyzes the feedback data received by the reception circuitry, and determines a communication status of the wireless communication terminal including a radio environment of the wireless communication network; and
   reproduction control circuitry, which in operation, controls reproduction processing of the content data performed by the reproduction processing circuitry in accordance with the communication status determined by the communication status determination circuitry, wherein the reproduction processing circuitry decodes the content data encoded by the encoder, and performs the reproduction processing under control of the reproduction control circuitry.

10. The wireless communication terminal according to claim 9, comprising
encoding parameter control circuitry, which in operation, controls an encoding parameter of the encoding circuitry in accordance with the communication status determined by the communication status determination circuitry.

11. The wireless communication terminal according to claim 9, wherein
the transmission circuitry includes a plurality of transmission interfaces that are logically different from each other, and
the wireless communication terminal includes multiple-interface transmission control circuitry, which in operation, controls transmission modes of the content data encoded by the encoding circuitry to be transmitted by the plurality of transmission interfaces in accordance with the communication status determined by the communication status determination circuitry.

12. The wireless communication terminal according to claim 1, wherein
the network address is indicated by an IP address.

13. A communication control method to be performed by a wireless communication terminal for transmitting content data and feedback data to a determined content data destination and a determined feedback data destination, respectively, by way of a wireless communication network, the communication control method comprising:
encoding the content data and output as encoded content data;
setting a feedback data destination address for the wireless communication terminal, wherein the feedback data destination address is set on the wireless communication terminal;
transmitting the encoded content data and the feedback data to the wireless communication network;
receiving the feedback data transmitted from the transmission circuitry and returned without passing by the determined content data destination; and
reproducing the content data in accordance with influence that the feedback data received by the reception circuitry undergo in a course of propagating in the wireless communication network without passing by the determined content data destination,
wherein:
the determined feedback data destination is a base station or a wired network, and
the determined content data destination is a broadcast station.

14. The communication control method according to claim 13, wherein
the feedback data is the encoded content data.

15. The communication control method according to claim 13, comprising
transmitting data generated by duplicating the encoded data as the feedback data to the wireless communication network.

16. The communication control method according to claim 13, comprising
encoding the content data by means of a first encoding parameter and encoding the content data by means of a second encoding data on occasion of encoding the content data, wherein
a volume of data achieved when the content data is encoded by means of the second encoding parameter is smaller than a volume of data achieved when the content data is encoded by means of the first encoding parameter, and
the feedback data is data produced by encoding the content data by means of the second encoding parameter.

17. The communication control method according to claim 13, comprising
generating index data including information that is necessary for the wireless communication terminal to analyze influence which the feedback data to be transmitted undergoes in the wireless communication network, wherein
the feedback data is the index data.

18. The communication control method according to claim 17, comprising
analyzing the received feedback data and determining a communication status of the wireless communication terminal including a radio environment of the wireless communication network; and
controlling reproduction processing of the content data in accordance with the determined communication status, wherein
the encoded content data is decoded, and the reproduction processing is performed under control pertinent to the reproduction processing.

19. The communication control method according to claim 18, comprising
controlling an encoding parameter to be used in encoding the content data in accordance with the determined communication status.

20. The communication control method according to claim 18, comprising
controlling a transmission mode of the encoded content data in accordance with the determined communication status.

21. The communication control method according to claim 13, wherein:
the network address is set on the encoded content data for the wireless communication terminal to prepare the feedback data;
the feedback data that is transmitted from the wireless communication terminal is received and returned without passing by a transmission destination by way of the wireless communication network; and
the content data is reproduced in accordance with influence that the received feedback data undergo in a course of propagating in the wireless communication network without passing by the transmission destination.

* * * * *